United States Patent
Zhang et al.

(10) Patent No.: US 11,546,381 B1
(45) Date of Patent: Jan. 3, 2023

(54) UNIFIED DATA SECURITY LABELING FRAMEWORK

(71) Applicant: Beijing Bytedance Network Technology Co., Ltd., Beijing (CN)

(72) Inventors: Jianqing Zhang, Los Angeles, CA (US); Zhengqin Luo, Los Angeles, CA (US); Deyang Yin, Culver City, CA (US); Zhipeng Tian, Culver City, CA (US); Xiangyun Cao, Culver City, CA (US)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/672,499

(22) Filed: Feb. 15, 2022

Related U.S. Application Data (60) Provisional application No. 63/276,865, filed on Nov. 8, 2021.

(51) Int. Cl.
*H04L 29/00* (2006.01)
*H04L 9/40* (2022.01)

(52) U.S. Cl.
CPC .......... *H04L 63/20* (2013.01); *H04L 63/0236* (2013.01); *H04L 63/102* (2013.01); *H04L 63/105* (2013.01)

(58) Field of Classification Search
CPC ............. H04L 63/20; H04L 63/0236; H04L 63/102; H04L 63/105
See application file for complete search history.

(56) References Cited

U.S. PATENT DOCUMENTS

| | | | | |
|---|---|---|---|---|
| 7,499,935 | B2* | 3/2009 | Lawrence | G06F 16/24575 707/999.102 |
| 9,063,897 | B2* | 6/2015 | Hamilton | G16H 10/65 |
| 9,787,639 | B1* | 10/2017 | Sun | H04L 63/0263 |
| 9,961,415 | B2* | 5/2018 | Philpott | H04L 65/602 |
| 10,019,135 | B1* | 7/2018 | Morris | H04L 51/04 |
| 10,057,204 | B2* | 8/2018 | Miller | H04L 51/32 |
| 10,657,457 | B1* | 5/2020 | Jeffery | G06N 20/00 |
| 10,749,875 | B2* | 8/2020 | Vincent | H04L 63/102 |
| 10,943,022 | B2* | 3/2021 | Luttwak | G06F 21/6218 |
| 11,301,489 | B2* | 4/2022 | Testardi | G06F 3/067 |
| 11,310,539 | B1* | 4/2022 | Yun | H04N 21/4668 |
| 2004/0015701 | A1* | 1/2004 | Flyntz | G06F 21/6218 713/182 |
| 2008/0100442 | A1* | 5/2008 | Grunwald | H04L 63/20 340/572.1 |
| 2008/0168135 | A1* | 7/2008 | Redlich | G06F 16/26 709/204 |
| 2009/0310851 | A1* | 12/2009 | Arcas | G06T 7/55 382/154 |
| 2010/0250497 | A1* | 9/2010 | Redlich | H04L 63/105 707/661 |

(Continued)

*Primary Examiner* — Don G Zhao (57) ABSTRACT

Systems and methods directed to providing a data security labeling framework at a first device are described. The system may include a storage area and at least one data labeler. The data labeler may be configured to locate one or more data instances, define one or more security attributes to be used under one or more different contexts, and apply a labeling to the located one or more data instances such that each label provided by the labeler includes or is otherwise associated with a plurality of security attributes.

17 Claims, 5 Drawing Sheets

(56) References Cited

U.S. PATENT DOCUMENTS

| | | | |
|---|---|---|---|
| 2011/0035506 A1* | 2/2011 | Araujo Junior | G06F 9/54 |
| | | | 709/231 |
| 2011/0238984 A1* | 9/2011 | Roush | G06F 21/53 |
| | | | 713/166 |
| 2013/0042298 A1* | 2/2013 | Plaza Fonseca | H04L 63/102 |
| | | | 726/1 |
| 2013/0160072 A1* | 6/2013 | Reus | H04L 63/102 |
| | | | 726/1 |
| 2018/0014161 A1* | 1/2018 | Warren | G06F 16/24578 |
| 2018/0191781 A1* | 7/2018 | Palani | G06F 21/552 |
| 2018/0307859 A1* | 10/2018 | LaFever | G16H 10/60 |
| 2018/0365580 A1* | 12/2018 | Musuvathi | G06N 5/04 |
| 2019/0222480 A1* | 7/2019 | Smith | H04L 63/20 |
| 2020/0120127 A1* | 4/2020 | Tyers | G06Q 20/4016 |
| 2020/0257549 A1* | 8/2020 | Vlaznev | H04L 63/20 |
| 2020/0285464 A1* | 9/2020 | Brebner | G06F 8/311 |
| 2020/0285788 A1* | 9/2020 | Brebner | G06K 9/6289 |
| 2020/0285977 A1* | 9/2020 | Brebner | G06N 5/022 |
| 2020/0401719 A1* | 12/2020 | Denker | G06F 21/6227 |
| 2021/0334787 A1* | 10/2021 | Milne | G06Q 20/3829 |
| 2021/0336899 A1* | 10/2021 | Tiagi | G06N 5/003 |
| 2022/0012672 A1* | 1/2022 | Inman | G06Q 10/063112 |
| 2022/0050921 A1* | 2/2022 | LaFever | H04L 9/0891 |
| 2022/0108262 A1* | 4/2022 | Cella | G05B 19/41885 |

* cited by examiner

UNIFIED DATA SECURITY LABELING FRAMEWORK

CROSS-REFERENCE TO RELATED APPLICATIONS

This application claims priority to U. S. Provisional Application Ser. No. 63/276,865, filed Nov. 8, 2021, and titled "UNIFIED DATA SECURITY LABELING FRAMEWORK" the disclosure of which is incorporated herein by reference in its entirety.

BACKGROUND

Current data labeling systems are generally directed to single security application scenarios where security levels for data and corresponding security rules have previously been defined according to an existing or already defined standard. That is, a labeling system may define a data category, but may not provide a uniform way to define or locate a particular dataset in an existing category. For example, different columns in database tables and data fields in APIs with different names can exist in and/or as a same data category. Accordingly, a mechanism to associate data instances across an organization to the data category such instances fall into is needed.

Further, while one or more security levels for data may be defined for an organization, a data standard may not define the security polices related to how the processing of the data may be different at each different security level. That is, current data security standards only define a general security one-dimensional attribute for a policy. One-dimensional security attributes cannot cover all security requirements and scenarios for a policy and/or standard. As another example, privacy attributes may be defined and utilized; however, current data labeling systems cannot support additional security attributes. For example, a flat data labeling system is not expressive and cannot handle sophisticated context. As an example, an email address may refer to a user's email address that is registered with a service provider or may refer to an account name associated with a third-party social network. Thus, current labeling systems do not take account the context of data. What is needed therefore, is an extensible data labeling framework and/or language which supports different security applications and/or scenarios.

BRIEF SUMMARY

In accordance with examples of the present disclosure, a system for providing a data security labeling framework at a first device is described. The system may include one or more storage areas including different data paradigms and at least one data labeler. The data labeler may be configured to locate one or more data instances, define one or more security attributes, the usage of which may be assigned under one or more different contexts, and apply a labeling to the located one or more data instances such that each label provided by the labeler includes or is otherwise associated with a plurality of security attributes.

In accordance with examples of the present disclosure, a method of labeling data using a data security labeling framework is described. The method may include receiving a request for a data instance; locating the data instance; defining one or more security attributes to be used under one or more different contexts; and applying a label to the located data instance, wherein the label includes or is otherwise associated with the one or more security attributes and includes a data type and semantic type for the data instance, the semantic type being associated with a context of the one or more different contexts.

In accordance with examples of the present disclosure, a system for providing a data security labeling framework at a host device is described. The system may include a storage area; and at least one data labeler. The data labeler may be configured to receive a request for a data instance; locate the data instance in the storage area; define one or more security attributes to be used under one or more different contexts; and apply a label to the located data instance, wherein the label includes or is otherwise associated with the one or more security attributes and includes a data type and semantic type for the data instance, the semantic type being associated with a context of the one or more different contexts.

In accordance with examples of the present disclosure, an electronic device comprising a memory and a processor is described. In examples, the memory is used to store one or more computer instructions which, when executed by the processor, cause the processor to: receive a request for a data instance; locate the data instance in a storage area; define one or more security attributes to be used under one or more different contexts; and apply a label to the located data instance, wherein the label includes or is otherwise associated with the one or more security attributes and includes a data type and semantic type for the data instance, the semantic type being associated with a context of the one or more different contexts.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Data security labeling, or tagging, is intended to identify data categories and/or labels associated with data and associate the data with security and/or privacy attributes based on the application context, security requirements, and data lineage. In examples, the data may be assigned to security and/or privacy attributes, or the security and/or privacy attributes may be assigned to the data, based on the application context, security requirements and data lineage. Thus, data security labeling provides a basis for security policy enforcement. A data security labeling system may track the changes of data security attributes and the replication and propagation of data, minimize the impact of the changes to labeling and data attributes on applications, and provide tools for security compliance teams.

For example, different columns in database tables and data fields in APIs with different names can exist in and/or as a same data category. Accordingly, a mechanism to associate data instances across an organization to the data category such data instances belong is needed. Furthermore, current labeling systems only provide a single dimension of security attributes and are not extensible. That is, each data category may only have a single security attribute defined by an in-place, or already existing, security standard. For example, one or more security levels for data may be defined for an organization; however, the data standard may not define the security polices related to how the processing of the data may be different at each different security level. That is, existing data security standards only define a general security one-dimensional attribute for a policy. One-dimensional security attributes cannot cover all security requirements and scenarios for a policy and/or standard. As another example, privacy attributes may be defined and utilized; however, current data labeling system do not support additional security attributes.

As another example, flat data labeling, or labeling data with one-dimensional attributes, is not expressive and cannot handle or support sophisticated or complex data categories. For example, given an email address, the email address could represent a user's email box when the user registers with an organization. Alternatively, or in addition, the email address may represent an account name for a third-party social network. Current labeling systems do not present and/or support the context of a data concept. Rather, such labeling systems only indicate the usage of data and do not provide any information related to what the data is. Although labeling using one-dimensional attributes simplifies the data labeling process, poor expressiveness cannot and does not support flexible security policies.

As another example, suppose a policy pseudonymizes all identifiers relevant to users; in examples, this policy may be applied to userIDs, device_ids, video_ids, etc. In current labeling systems, the identifiers themselves can only be enumerated. However, if these data categories could carry or otherwise be associated with additional context information, the data labeling process may be more efficient. In addition, some data categories can include or reference other categories. For example, establishing a relationship between categories can be expressed as following_relation={follower, followee} and can be applied to frames or audio in a video clip, etc. Current labeling systems cannot and do not support such sophisticated data structures.

To address these shortcomings, examples of the present disclosure provide a universal, cross-platform data security labeling framework that includes a more expressive and extensible data labeling model and/or language. In examples, data may take the form and type as further described below. Accordingly, an extensible data labeling framework and/or language supporting different security applications and/or scenarios is described herein to address the short-comings of previous data labeling systems.

In accordance with examples of the present disclosure, a security labeling framework may be applied to data-at-rest and data-in-transit/data-in-memory, where data-at-rest may refer to data that is stored persistently in a variety of databases, including online/offline databases and data-in-transit/data-in-memory may referrer to data exchanged between one or more systems via a variety of application programming interfaces (APIs) using HTTP and/or Thrift/RPCs for example. Data type may refer to the classification of data values. Such data types may refer to basic types such as, but not limited to, string, int64, etc. More sophisticated data types may include or otherwise make available semantic concepts, including, but not limited to, IP address, email address, list of usernames (strings), etc. Sophisticated data types may be regular expressions of a basic data type.

Relying on a data type is insufficient to indicate the usage of the data in applications and other scenarios. That is, a data type does not provide data logic or semantic meaning. For example, an IP address could either be a device's network address or an address of a host on a network. An email address could be an employee's email, a user's email, or just an account name of a third-party social network. A username list could refer to either a following_list or a follower_list. To address these issues, the concept of a semantic type attribute of data may be utilized. The semantic type may define the application/business logic of the data, or use scenario and context, like username, user's email address, employee's email address, etc. Different semantic types can be presented by the same data type. For example, a user's device's network address and an internal host network address are both IP addresses of the same data type (e.g., IP address). As another example, a user's email address and an employee's email address are both of data type email address. Semantic type determines the business logic of the data upon which the security attributes and corresponding policies are to be defined.

In examples, a data label may comprise one or more data instances; the one or more data instances may include one or more data types and one or more semantic types. In examples, a semantic type is different from a security attribute in that a security attribute is defined in a security application and/or requirement while a semantic type is defined by an application where the data is used. Existing labels do not specify a semantic type together with a data type. For example, for third party social network accounts, a data label does not specify if the account is a general string or an email address. Accordingly, the concept of using a data label that includes one or more data types and one or more semantic types, as described above, enhances the flexibility of data labeling and security definitions.

Data instances may comprise data sets of each data category or data label. That is, data instances are the data entities that are stored and/or transferred for an application.

A data category, or data label, may have different data instances in different applications. Examples of data instances include, but are not limited to, a field/column of a table in a database, a parameter/argument in an API request, a field in an API response, etc. The data instances which belong to the same data categories may be assigned the same security attributes and comply with the same security policies. Data instances may belong to a same data category and may have different (instance) names in different applications. Even for the same application, different developers may name data instances in different ways in different submodules, which may make data labeling difficult and complex.

Thus, for a data labeling system to provide a desired level of security and/or meet or exceed a data policy, the data labeling must be at least (1) accurate to precisely identify data categories and assign security attributes; (2) complete such that the data labeling system covers data usage or data footprints as much as possible; (3) flexible and easy to update such that a data category's security attributes can change as the security requirements change, and the identification of data labeling may evolve or change as an organization evolves or changes—a flexible and efficient data labeling system can handle these changes with minimal cost; and (4) extensible for one or more attributes such that a data category or label may have different security attributes according to various security requirements (e.g., one or more levels of a security requirement may include different security attributes such that the data labeling system is able to support security attributes in multi-dimensions for different security scenarios).

In accordance with examples of the present disclosure, a data labeling system may include locating, describing, and/or naming a data instance. Such a system may then define a data label by defining a data type and a semantic type. Examples of a data type may include, but are not limited to an identifier such as an ID, an IP address, an email address, etc. Examples of a semantic type may include, but are not limited to a user email address, employee email address, user device address, device host address, etc. In examples, the data labeling system may then define one or more security attributes to be used under different contexts. For example, security attributes of a certain security policy may categorize data into four security levels, such as but not limited to public, internal, confidential, and secret. As another example, a third security policy may be associated with security attributes directed to data visibility (e.g., public or private). A fourth security policy may be associated with security attributes that are directed to data privacy, such as whether such data is identifiable or unidentifiable. The data labeling system may then add labeling to metadata tables based on the located, described, and/or named data instance, defined data label, and defined security attributes for different contexts. Accordingly, one or more security policies may then be defined that are relevant to the security attributes.

In accordance with examples of the present disclosure, to update a data label, the data labeling system may locate one or more data instances. For example, a location of a data instance may refer to a location for a set of data instances. Accordingly, one or more data labels and/or one or more security attributes can be updated.

In accordance with examples of the present disclosure, a data labeling markup language may be used to label data. Examples excerpts of data labeling markup language which presents a general language for data labeling by defining and/or describing an instance of a data category, its data type, and semantic type are provided below.

In accordance with examples of the present disclosure, when describing data instances, a namespace may be used to specify the application context which implies the data form. For example, if the data instance is an argument or parameter in an HTTP API or an RPC API, the namespace can be http or rpc respectively; if it is in a column in an online/offline database table, it can be mysql or hdfs respectively. An example namespace in JSON notation, may be "ns": "http".

In accordance with examples of the present disclosure, when defining a data category's (security) attributes, the namespace can be used to indicate the security requirements, context, and/or dimension. For example, an identifier associated with a data security policy may indicate the attribute is based on the security policy, while a "privacy" identifier may indicate the attribute is based on user data privacy. An example security attribute in JSON notation may be "ns": "security_policy_id".

In accordance with examples of the present disclosure, a location may indicate the physical location where the data is stored or where a service is hosted. That is, the location represents the physical storage location of a data instance or the location where the service is located, such as specific data in a certain country/region/center; or the deployment location of a service. For example, r:us/vdc:virtual-datacenter-1 may indicate the data is stored at the location r:us/vdc:virtual-datacenter-1. An example location may be specified in JSON notation as follows: "location": "r:us/vdc:virtual-datacenter-1".

In accordance with examples of the present disclosure, a path may be a hierarchical name for a particular data instance. As an example, the instance can be a column in a database table, or an argument in an API. For example, a column in a database table may be db:db_name/table:table_name/col:column_name. An example path for a column in a database table, in JSON notation, may be as follows: "path" "db:organization/table:users/col:email".

A parameter or a return value in an API may be rpc:rpc_name/api:api_name/interface:intf_name/res/payload:pl_name.

An example path for a parameter or a return value in an API, in JSON notation, may be as follows: "path": "rpc:rpc_name/api:api_name/interface:intf_name/res/payload:pl_name".

In accordance with examples of the present disclosure, a label represents a data category or data label. As previously discussed, the label may include a datatype and semantic type, where a datatype can refer to basic data types including, but not limited to, string and int. An abstract datatype may also be defined; such abstract datatypes may refer to email addresses, IP addresses, a username or handle list, etc. Based on the basic types, abstract data types can be represented by regular expressions or compositions. Below is example of an email label, in JSON notation.

JSON
{
  "datatype":
  "basictype": "string",
  "regx": "[\w-\.]+@([\w-]+\.)+[az]{2,3}"
  }
}

In accordance with examples of the present disclosure, a semantic type may indicate the data application's logic or semantic meaning in the context. For example, an email can be the email used by a user when the user registers with a service provider. Accordingly, the email can have the label of email_address under a basic personal information attribute. In some examples, the email may refer to a registered account with a third-party social network account. As another example, a username for a third-party social network account may can be assigned a label equal to "follower-list" or a label equal to "following_list." An example semantic type label, in JSON notation, may be as follows: "semantictype": "follower_list".

Data labels with same semantic type may have different data types in different systems. For example, a follower_list can be either a list of usernames or a list of email addresses. For purposes of providing greater flexibility for a data labeling system, the data type and the semantic type can be defined separately.

In accordance with examples of the present disclosure, attributes may indicate a data label's attributes in terms of different security requirements and applications. A particular attribute can be defined by the namespace and value, where the namespace can define or provide the security requirement or context. For example, a value of a username's attribute on a particular system may be "secret" while on a different system, the value may be "identifiable." An example attribute, in JSON notation, may be as follows:
JSON
{
  "attributes": [
  {"ns": "security", "value": "secret" },
  {"ns": "privacy", "value": "identifiable" }]
}

As a more complete example, an email address for a user can be defined or described by the following:
JSON
{
  "ns": "mysql", //the email address is stored in a mysql database
  "location": "r:us/vdc:virtual-datacenter-1", //the location of the database
  "path": "db:organization/table:users/col:social_network_acct", //the column where the email address is stored
  "label": {
    "datatype": {
      "basictype": "string",
      "regx": "[\w-\.]+@([\w-]+\.)+[az]{2,3}" //this is an email
    },
    "semantictype": "social_network account"
  },
  "attributes" [
  {"ns": "security", "value": "secret" },
  {"ns": "privacy", "value": "identifiable" }
  ]
}

In accordance with examples of the present disclosure, based on a comprehensive data labeling service framework, a unified, integrated and flexible data security labeling service can be provided. The framework provides an abstract data security labeling language, as well as data security services, e.g., a unified data security service, which can integrate all data labeling information from different data labeling systems within an organization. Regarding each data labeling systems, each system may be configured to use organizational specific use case scenarios and implement customized data identification rules, metadata database, etc. Thus, different data labeling systems can be integrated or merged with a single framework, and all metadata can be mapped or migrated to a single data labeling database and/or service. Such service can provide universal APIs for a variety of users and their applications.

Thus, in some instances, new types of users and/or new business data can be labeled and assigned one or more security attributes to allow real-time querying of the security attributes of certain data according to the security attributes and/or corresponding security strategy for the corresponding data operations. In a legal compliance/team audit environment, the security attributes of a certain data exceptions can be queried in real time, and used to determine whether the use/storage of the data meets compliance requirements. Further, such a labeling system allows for the understanding of the storage and uses of different forms of data instances of a specific data field in various systems of an organization. Further, such a system allows the easy implementation of new security needs; that is, new security attribute dimensions can be assigned to existing data categories according to new rules. Existing data can be processed in accordance with the new security requirements such that changes in the security requirements result in the existing security attributes being updated. Other uses may be directed to the following non-limiting examples: querying a data instance's security attribute and checking to determine if the usage and/or storage of the data meets the compliance requirements; checking certain data labels different instances in storage and service API calls, as well as the data lineage; according to a new security requirement, adding new security attributes and assigning them to existing data categories; based on the distribution of data instances, requesting organizational teams to process the data with the new security policies.

In accordance with examples of the present disclosure, the data labeling system described above may be used for purposes of mapping data throughout an organization. Data mapping tracks the flow of data to, thru, and from an organization. More specifically, a data map (also known as a data flow) may provide the following non-limiting information regarding the data under control: (1) where the data comes from (e.g. customers, staff and third parties); (2) the purpose of the data; (3) the entry point; (i.e. how it enters an organization (e.g. a telephone call, email or online form)); (4) the format of the data (e.g., excel, word document, CRM customer account); (5) where the data is stored, such as but not limited to an a host, a filing cabinet, an in-house server, or cloud database; (6) the country the data is stored in; (7) where the data is accessible from; and/or (8) who has access to the data. A data map involves looking at all areas of a business, identifying each and every instance where data is being processed, and identifying the purposes of processing and the individual activities that are involved in that processing.

Therefore, a transition from a previous data security system where data labeling relies on data sampling (e.g., where an API labeling is strongly dependent and storage marking is weakly dependent), data labeling, and data sampling can be divided into two separate parts. For an API marking scheme, data sampling may be performed prior to marking, as the purpose of the data sampling is to obtain a structure of a request and response. However, for future data labeling efforts relying on the same API, an interface definition language (IDL) may be used to map the previous data security map to a new extensible labeling scheme. For a storage marking scheme, as there is no context between sampling and marking, database information, such as table structure, fields, etc. may provide necessary information without sampling and can be used to mark, or label, existing business line data. For some security schemes, sampling may be implemented after the data has been marked.

In examples, starting with a namespace, data may be marked and stored utilizing a namespace-object-path to determine a schema and/or a namespace-object-path to identify a set of samples. Thus, using a traffic parser and rules engine, a schema related to a request and response may be identified. A rules engine may cause actual data obtained by the traffic parser to be marked. By utilizing the marking schema, the queries per second (QPS) of the read operation should be much larger than the QPS of the write operation. Thus, marking the overall schema information stored in one place will improve service performance. Further, by complying with a Unified Data Security Labeling Framework format (Unified Data Security Labeling Framework/Unified Data Security Labeling Framework Schema), regardless of the source of the schema, each application processing data may provide an IDL. Thus, the final destination of the data is in the same schema format thereby decoupling marking and sampling such that sampling does not need to be used as a precondition for marking.

The design of data labeling is similar to a tree-like storage structure for the schema of a path under the object in the namespace. In examples, operations, such as create, read, update, and/or delete (CRUD) operations and requirements can be satisfied by such a model. Stated another way, data labeling and access may be similar to using a key value when storing data, where the key is not a simple string, but is the namespace, object, and path, and the value is the schema and sample. Regardless of the type of storage implemented, (e.g., HTTP or RPC), the namespace, object, and path support the schema and sampling. Once a schema and a set of samples are determined, new types of data may be configured or used. Thus, using a pattern concept to extend how the path is utilized may support more complex path configurations.

Figure 1:
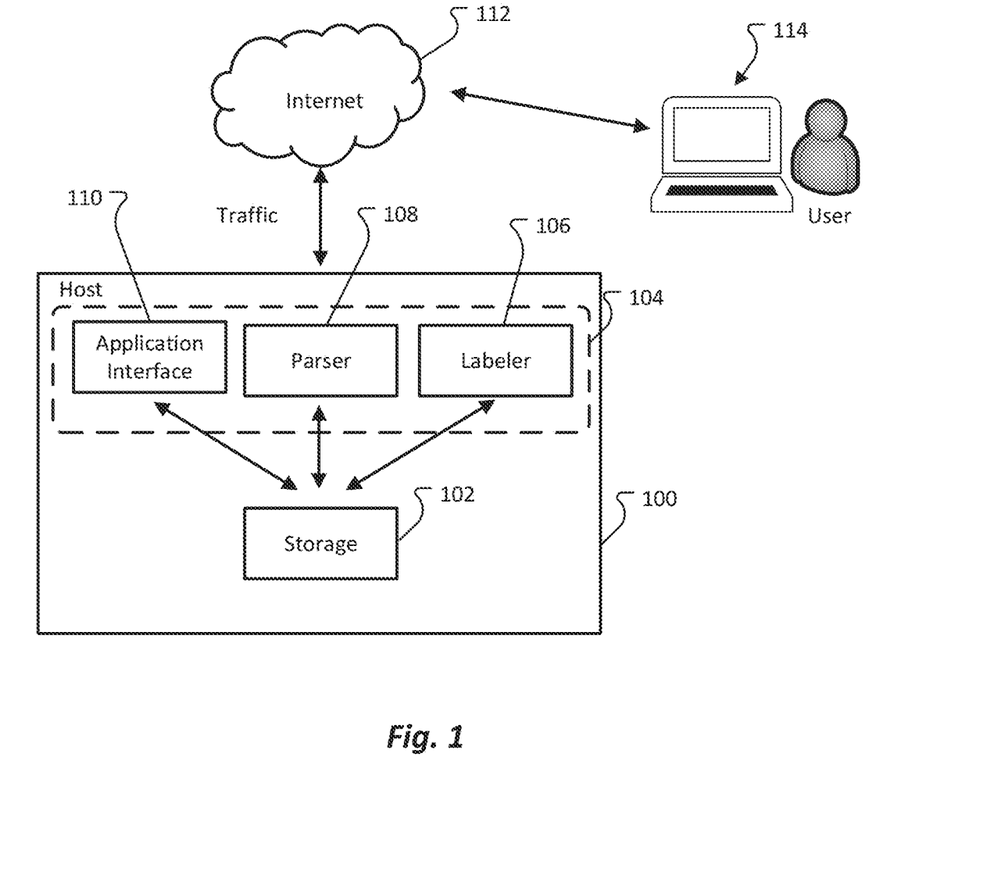
FIG. 1 depicts an example data security labeling framework in accordance with examples of the present disclosure.

FIG. 1 depicts details of an example data security labeling framework 104 in accordance with examples of the present disclosure. The data security labeling framework 104 may be implemented at a host device 100 and may generally refer to one or more of an application interface 110, a parser 108, and/or a labeler 106. In examples, data from storage area 102 may be provided to one or more of the application interface 110, the parser 108, and/or the labeler 106; in some examples, the application interface 110, the parser 108, and/or the labeler 106 may communicate or otherwise interact directly with one another. In other examples, each of the application interface 110, the parser 108, and/or the labeler 106 may first obtain one or more pieces of the data from the storage area 102, process the data in some manner, and then provide the processed data back to the storage area 102. In accordance with examples of the present disclosure, the application interface 110 may refer to an application programming interface (API). In some examples, the storage area 102 may refer to a plurality of different storage areas.

In accordance with examples of the present disclosure, the data may be accessible externally from the host device 100. For example, a user operating a computing device 114 may access data in the storage area 102 via the internet 112 and/or one or more interfaces of the host device 100. As previously described, the information in the storage area 102 may correspond to data in accordance with a previously implemented data security map and/or data in accordance with the data security labeling framework described herein. In some examples, where data is consistent with a previously implemented data security map, the parser 108 and/or the labeler 106 may parse information upon access or read and determine one or more labels or security attributes to be applied to the data and then stored in the storage area 102. In some examples, the labeler 106 may make such determination by determining a label to be applied (in some instances, based on an IDL). Accordingly, the parser 108, may sample or otherwise obtain data for use in accordance with other audit and security checks.

Figure 2:
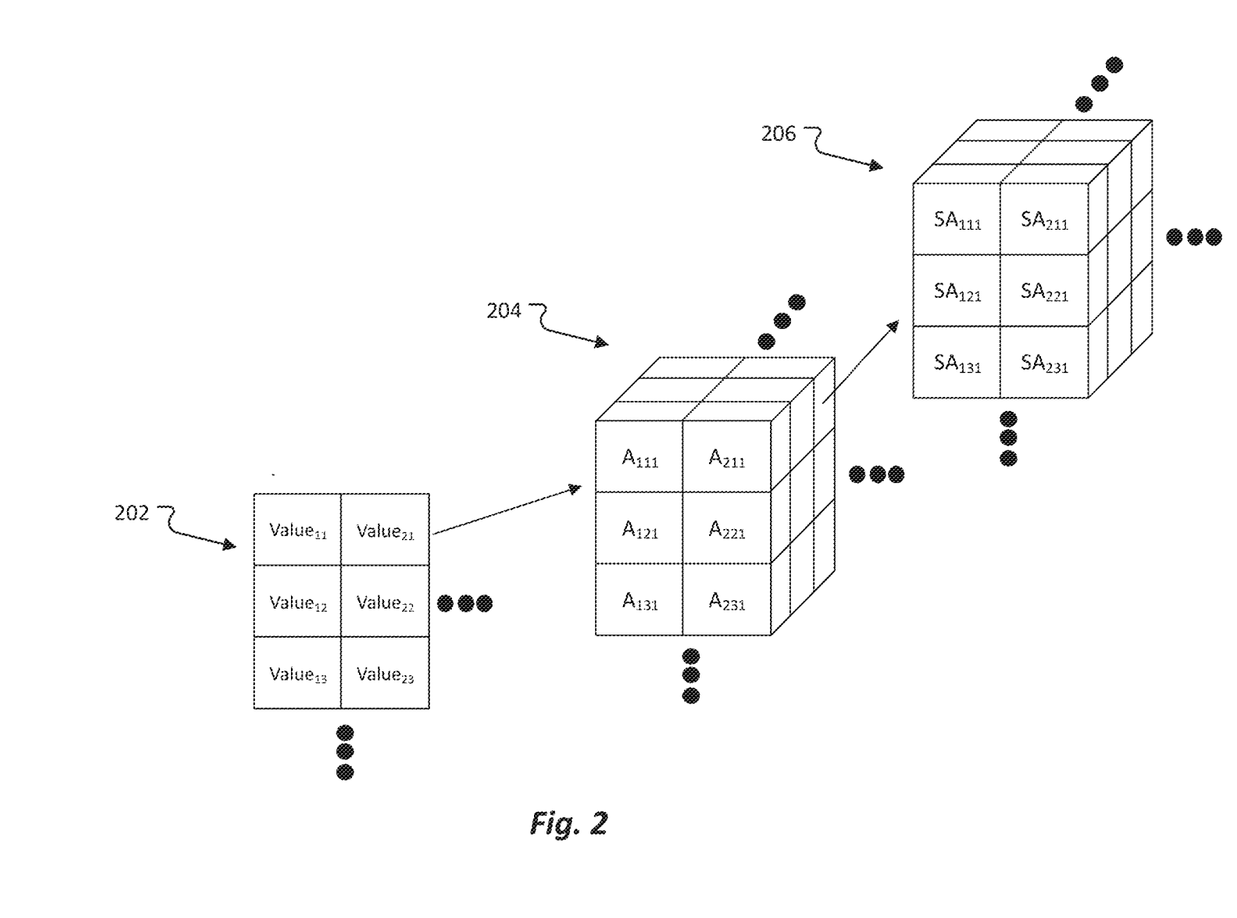
FIG. 2 depicts an example data storage diagram together with associations of one or more security attributes in accordance with examples of the present disclosure.

As depicted in FIG. 2, data stored in the storage area 102 may correspond to information in a table 202. Although illustrated as a table, for example in a database, the information may be stored in one or more various databases, files, or otherwise and may utilize an application programming interface (API) to access and/or store such data. In examples, each data value in the table 202 may be associated with a plurality of attributes 204. The plurality of attributes 204 may correspond to a semantic type as previously described. In examples, and consistent with the present disclosure, a value in the position 2,1 of table 202 may correspond to a plurality of attributes 204, where a data label comprising a semantic type may provide additional information about the value at a specific position in the table 202. Further, each of the attributes 204 may be further associated with a plurality of sub-attributes or other data describing the attribute 204. Alternatively, or in addition, each of the sub-attributes 206 may correspond to a data label comprising one or more data types and one or more semantic types as previously described.

In accordance with examples of the present disclosure, a data instance may be requested by one or more applications; the data instance may include a plurality of values in the table 202 together with the plurality of attributes 204 and/or sub-attributes 206. Each of the attributes 204 and/or sub-attributes 206 may refer to a security attribute as previously mentioned. In accordance with examples of the present disclosure, a data labeling system or framework 104, such as data labeling system at the host device 100, may locate, describe, and/or name a data instance. Such a system may then define a data label by defining a data type and a semantic type. Examples of a data type may include, but are not limited to an identifier such as an ID, an IP address, an email address, etc. Examples of a semantic type may include but are not limited to a user email address, employee email address, user device address or identifier, device host address or identifier, etc. In examples, the data labeling system may locate the data, for example one or more values in the table 202, then define one or more security attributes to be used under different contexts. For example, one or more security attributes 204 may be defined for one or more data locations in the table 202. The data labeling system, such as a data labeling system or framework 104 implemented at the host device 100, may then add labeling to metadata tables based on the located, described, or named data instance, defined data label, and defined security attributes for different contexts. For example, the labeling may be specific to defining and then storing the security attributes 204 and security sub-attributes 206 in a table, such as a metadata table. Accordingly, one or more security policies may then be defined that are relevant to the security attributes. In some examples, the one or more security policies may be determined based on the tagged security attribute or security sub-attribute.

Figure 3:
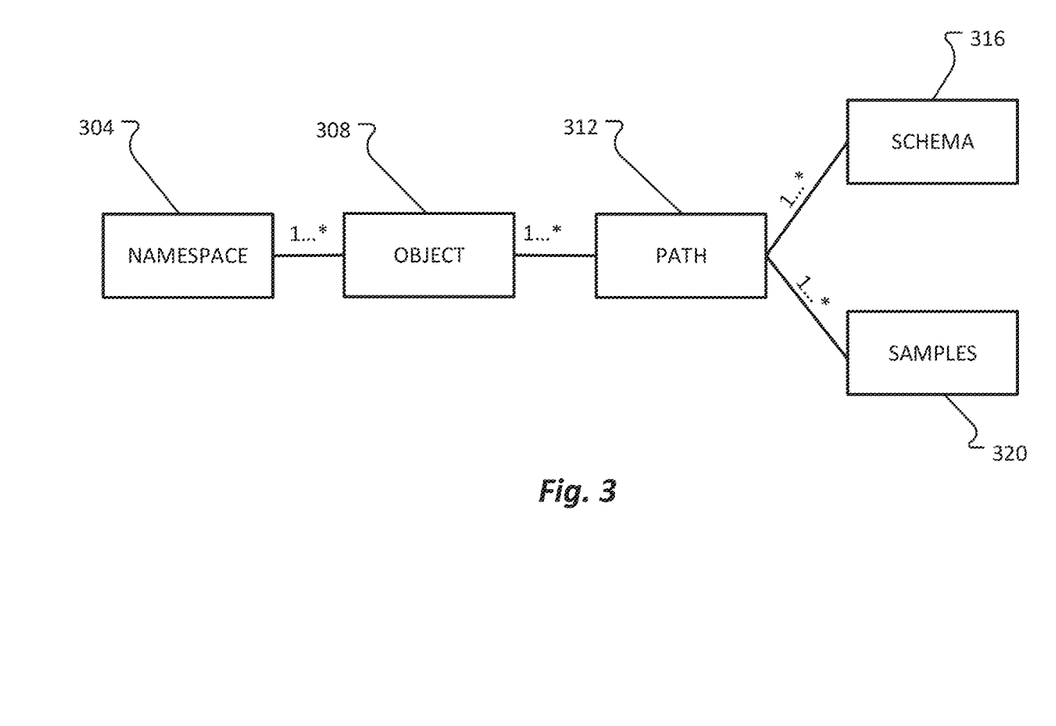
FIG. 3 depicts an example namespace-object-path in accordance with examples of the present disclosure.

As depicted in FIG. 3, data may be stored and/or labeled in accordance with a namespace-object-path example. In some examples, one or more attributes 204 and/or sub-attributes 206 may comprise the namespace 304, object 308, and/or path 312. In some examples, where data is parsed by the parser 108 and/or labeled by the labeler 106, a schema may be discovered and/or stored as schema 316; further such data value may be stored as a sample 320. Of course, the data may be accessible via the defined namespace-object-path traversal as previously described.

Figure 4:
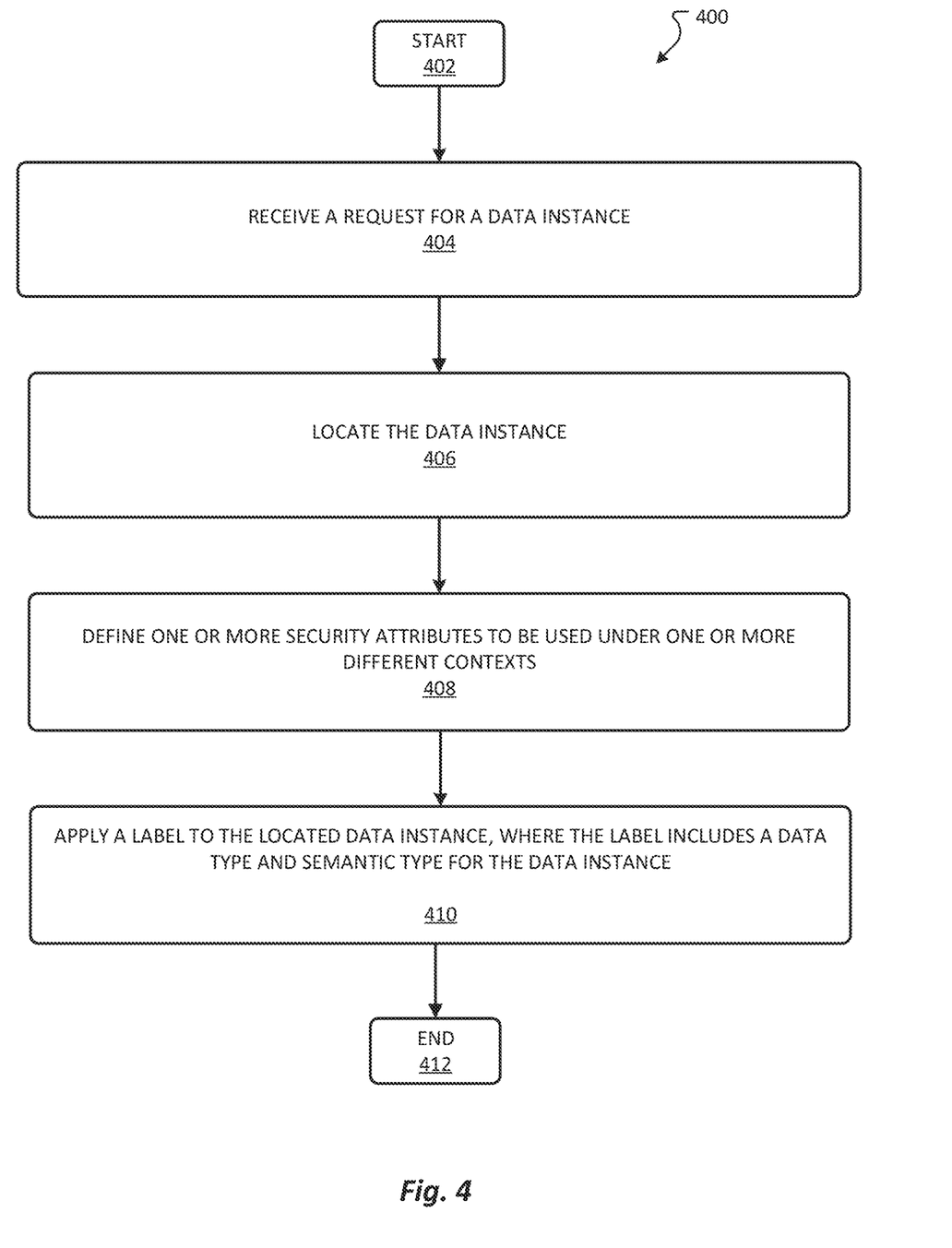
FIG. 4 depicts a simplified method for labeling data using a data security labeling framework in accordance with examples of the present disclosure.

Referring now to FIG. 4, a simplified method for labeling data using a data security labeling framework is described in accordance with examples of the present disclosure. A general order for the steps of a method 400 is shown in FIG. 4. Generally, the method 400 starts at 402 and ends at 412. The method 400 may include more or fewer steps or may arrange the order of the steps differently than those shown in FIG. 4. The method 400 can be executed as a set of computer-executable instructions executed by a computer system and encoded or stored on a computer readable medium. In an illustrative aspect, the method 400 is executed by a computing device, such as a host device 100. However, it should be appreciated that aspects of the method 400 may be performed by one or more processing devices, such as a computer, server, or other hardware element. Further, the method 400 can be performed by gates or circuits associated with a processor, Application Specific Integrated Circuit (ASIC), a field programmable gate array (FPGA), a system on chip (SOC), a neural processing unit, or other hardware device. Hereinafter, the method 400 shall be explained with reference to the systems, components, modules, software, data structures, etc. described in conjunction with FIGS. 1-3.

The method 400 starts at 402, where flow may proceed to 404. At 404, a request for a data instance may be received. In accordance with examples of the present disclosure, a data instance may be requested by one or more applications. In examples, a data labeling system or framework, such as data labeling system or framework (e.g., 104) at a host device (e.g., 100), may locate a data instance at 406. In examples, the data labeling system or framework may locate the data at 406, for example by locating one or more values in the table (e.g., 202). At 408, the data labeling system or framework may then then define one or more security attributes to be used under different contexts. For example, one or more security attributes may be defined for one or more data locations in a table. The data labeling system or framework may then add labeling to metadata tables based on the located, described, or named data instance, defined data label, and defined security attributes for different contexts. For example, the labeling may be specific to defining and then storing the security attributes and security sub-attributes in a table, such as a metadata table. Accordingly, one or more security policies may then be defined that are relevant to the security attributes. In some examples, the one or more security policies may be determined based on the tagged security attribute or security sub-attribute. In examples, the data labeling system or framework may define and apply a data label at 410 by defining a data type and a semantic type. Examples of a data type may include, but are not limited to an identifier such as an ID, an IP address, an email address, etc. Examples of a semantic type may include but are not limited to a user email address, employee email address, user device address or identifier, device host address or identifier, etc. The method 400 may end at 412.

Figure 5:
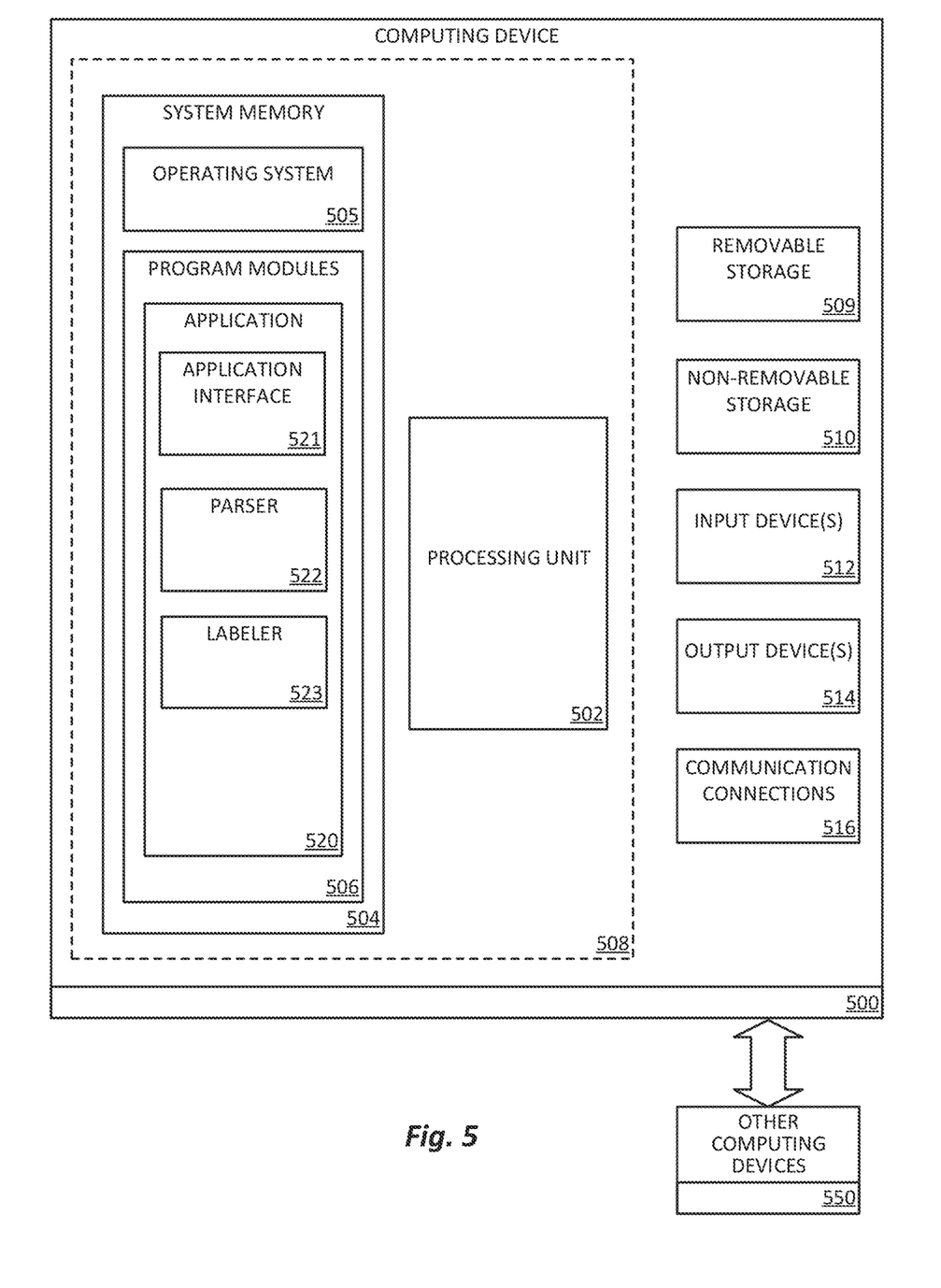
FIG. 5 depicts a block diagram illustrating physical components (e.g., hardware) of a computing device with which aspects of the disclosure may be practiced.

FIG. 5 is a block diagram illustrating physical components (e.g., hardware) of a processing device 500 with which aspects of the disclosure may be practiced. For example, the processing device 500 may represent one or more components as depicted in FIGS. 1-4. In a basic configuration, the processing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for performing the various aspects disclosed herein such. The operating system 505, for example, may be suitable for controlling the operation of the processing device 500. Furthermore, aspects of the disclosure may be practiced in conjunction with other operating systems, or any other application program and is not limited to any particular application or system. This basic configuration is illustrated in FIG. 5 by those components within a dashed line 508. The processing device 500 may have additional features or functionality. For example, the processing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, several program modules and data files may be stored in the system memory 504. While executing on the at least one processing unit 502, an application 520 or program modules 506 may perform processes including, but not limited to, one or more aspects, as described herein. The application 520 may include an application interface 521 which may be the same as or similar to the application interface 521 as previously described in more detail with regard to FIGS. 1-4. The application 520 may include a parser 522, which may be the same as or similar to the parser 108 as previously described in more detail with regard to FIGS. 1-4. The application 520 may include a labeler 523, which may be the same as or similar to the labeler 106 as previously described in more detail with regard to FIGS. 1-4. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the processing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The processing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The processing device 500 may include one or more communication connections 516 allowing communications with other computing or processing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the processing device 500. Any such computer storage media may be part of the processing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to labeling data using a data security labeling framework according to at least the examples provided in the sections below:

(A1) In one aspect, some examples include a method of labeling data using a data security labeling framework. The method may include receiving a request for a data instance, locating the data instance, defining one or more security attributes to be used under one or more different contexts, and applying a label to the located data instance, wherein the label includes or is otherwise associated with the one or more security attributes and includes a data type and semantic type for the data instance, the semantic type being associated with a context of the one or more different contexts.

(A2) In some examples of A1, the semantic type is based on an application where the data instance is used and the one or more security attributes are based on at least one of a security application or security requirement.

(A3) In some examples of A1-A2, the data type is at least one of a string data type or an integer data type.

(A4) In some examples of A1-A3, the data type is an identifier including at least one of an internet protocol (IP) address or an email address, and the semantic type is an address including at least one of a user email address, employee email address, user device address, or device host address.

(A5) In some examples of A1-A4, the one or more contexts include a plurality of security levels.

(A6) In some examples of A1-A5, the data instance is located in a data table and the one or more security attributes are based on a location in the data table.

(A7) In some examples of A1-A6, the method includes storing the label as metadata associated with the data instance.

(A8) In some examples of A1-A7, the method includes locating a second data instance, and applying a second label to the located second data instance, wherein the second label includes a data type that is the same as the data type for the label, and the second label includes a semantic type that is different than the semantic type for the label.

(A9) In some examples of A1-A8, a first security attribute associated with the second label is based on a first namespace, and a second security attribute associated with the second label is based on a second different namespace.

(A10) In some examples of A1-A9, the method includes representing the label using a data labeling markup language.

In yet another aspect, some examples include a system for providing a data security labeling framework at a host device. The system may include a storage area, and at least one data labeler configured to perform any of the methods described herein (e.g., A1-A10 described above).

In yet another aspect, some examples include a non-transitory computer-readable storage medium storing one or more programs for execution by one or more processors of a storage device, the one or more programs including instructions for performing any of the methods described herein (e.g., A1-A10 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart or process. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method of labeling data using a data security labeling framework, the method comprising:
receiving a request for a data instance;
locating the data instance;
defining one or more security attributes to be used under one or more different contexts; and
applying a label to the located data instance, wherein the label includes or is otherwise associated with the one or more security attributes and includes a data type and semantic type for the data instance, the semantic type being associated with a context of the one or more different contexts,
wherein the semantic type is based on an application where the data instance is used and the one or more security attributes are based on at least one of a security application or security requirement.

2. The method of claim 1, wherein the data type is at least one of a string data type or an integer data type.

3. The method of claim 1, wherein the data type is an identifier including at least one of an internet protocol (IP) address or an email address, and the semantic type is an address including at least one of a user email address, employee email address, user device address, or device host address.

4. The method of claim 1, wherein the one or more contexts include a plurality of security levels.

5. The method of claim 1, wherein the data instance is located in a data table and the one or more security attributes are based on a location in the data table.

6. The method of claim 1, further comprising:
storing the label as metadata associated with the data instance.

7. The method of claim 1, further comprising:
locating a second data instance; and
applying a second label to the located second data instance, wherein the second label includes a data type that is the same as the data type for the label, and the second label includes a semantic type that is different than the semantic type for the label.

8. The method of claim 7, wherein a first security attribute associated with the second label is based on a first namespace, and a second security attribute associated with the second label is based on a second different namespace.

9. The method of claim 1, further comprising representing the label using a data labeling markup language.

10. A system for providing a data security labeling framework at a host device, the system comprising:
a storage area; and
at least one data labeler, wherein the at least one data labeler is configured to:
receive a request for a data instance;
locate the data instance in the storage area;
define one or more security attributes to be used under one or more different contexts; and
apply a label to the located data instance, wherein the label includes or is otherwise associated with the one or more security attributes and includes a data type and semantic type for the data instance, the semantic type being associated with a context of the one or more different contexts,
wherein the semantic type is based on an application where the data instance is used and the one or more security attributes are based on at least one of a security application or security requirement.

11. The system of claim 10, wherein the data type is an identifier including at least one of an internet protocol (IP) address or an email address, and the semantic type is an address including at least one of a user email address, employee email address, user device address, or device host address.

12. The system of claim 10, wherein the data instance is located in a data table and the one or more security attributes are based on a location in the data table.

13. The system of claim 10, wherein the at least one data labeler is configured to:
represent the label using a data labeling markup language; and
store the label as metadata associated with the data instance.

14. The system of claim 10, wherein the at least one data labeler is configured to:
locate a second data instance; and
apply a second label to the located second data instance, wherein the second label includes a data type that is the same as the data type for the label, and the second label includes a semantic type that is different than the semantic type for the label.

15. The system of claim 14, wherein a first security attribute associated with the second label is based on a first namespace, and a second security attribute associated with the second label is based on a second different namespace.

16. An electronic device, comprising:
a memory and a processor;
wherein the memory is used to store one or more computer instructions which, when executed by the processor, cause the processor to:
receive a request for a data instance;
locate the data instance in a storage area;
define one or more security attributes to be used under one or more different contexts; and
apply a label to the located data instance, wherein the label includes or is otherwise associated with the one or more security attributes and includes a data type and semantic type for the data instance, the semantic type being associated with a context of the one or more different contexts, wherein the semantic type is based on an application where the data instance is used and the one or more security attributes are based on at least one of a security application or security requirement.

17. The electronic device of claim 16, wherein the processor is configured to:
   represent the label using a data labeling markup language; and
   store the label as metadata associated with the data instance.

* * * * *